United States Patent
Husson (10) Patent No.: US 11,617,296 B2
(45) Date of Patent: Apr. 4, 2023

(54) AGRICULTURAL MACHINE EQUIPPED WITH A DISTRIBUTION TIE-ROD

(71) Applicant: KUHN S.A., Saverne (FR)

(72) Inventor: Geoffroy Husson, Ottersthal (FR)

(73) Assignee: KUHN S.A., Saverne (FR)

(*) Notice: Subject to any disclaimer, the term of this patent is extended or adjusted under 35 U.S.C. 154(b) by 262 days.

(21) Appl. No.: 16/813,928

(22) Filed: Mar. 10, 2020

(65) Prior Publication Data
US 2020/0288623 A1    Sep. 17, 2020

(30) Foreign Application Priority Data
Mar. 13, 2019 (FR) ...................................... 19 02566

(51) Int. Cl.
*A01B 73/04* (2006.01)

(52) U.S. Cl.
CPC .................................. *A01B 73/044* (2013.01)

(58) Field of Classification Search
CPC ............................................. A01B 73/02–044
See application file for complete search history.

(56) References Cited

U.S. PATENT DOCUMENTS

| | | | | |
|---|---|---|---|---|
| 3,948,327 A | * | 4/1976 | Parker et al. | A01B 73/046 172/311 |
| 4,615,397 A | * | 10/1986 | Hastings | A01B 73/046 172/311 |
| 4,619,330 A | * | 10/1986 | Machnee | A01B 73/046 172/311 |
| 4,790,389 A | | 12/1988 | Adee et al. | |
| 4,996,833 A | * | 3/1991 | Von Allowerden | A01B 73/042 56/367 |
| 6,865,873 B2 | * | 3/2005 | Menichetti | A01D 78/146 56/367 |
| 8,505,645 B1 | | 8/2013 | Kelly et al. | |

FOREIGN PATENT DOCUMENTS

| | | | |
|---|---|---|---|
| CA | 2 252 293 A1 | 4/2000 | |
| CA | 2644615 C | * 9/2011 | ........... A01B 61/046 |
| FR | 2 085 920 A1 | 12/1971 | |

OTHER PUBLICATIONS

French Preliminary Search Report dated Nov. 12, 2019 in French Application 19 02588 filed on Mar. 13, 2019 (with English Translation of Categories of Cited Documents & Written Opinion), citing documents AA-AB & AO-AP therein, 8 pages.

* cited by examiner

*Primary Examiner* — Tara Mayo
(74) *Attorney, Agent, or Firm* — Oblon, McClelland, Maier & Neustadt, L.L.P.

(57) ABSTRACT

An agricultural machine hitched to a tractor and includes two side units and a frame, which extends in a longitudinal direction, each side unit including an arm mounted so as to pivot relative to the frame around a respective folding axis oriented substantially parallel to the longitudinal direction, each side unit including a tool unit connected to the frame through the respective arm and being able to occupy a work position in which it rests on the ground, each side unit including a connection allowing the respective tool unit in work position to move relative to the respective arm, the connection includes a lightening actuator enabling to exert an upward force on each tool unit in work position. The machine includes a tie-rod connected to each of the arms through a respective upper joint of an axis parallel to the respective folding axis.

11 Claims, 8 Drawing Sheets

AGRICULTURAL MACHINE EQUIPPED WITH A DISTRIBUTION TIE-ROD

BACKGROUND OF THE INVENTION

Field of the Invention

The present invention relates to the general technical field of agricultural machinery. More specifically, it relates to an agricultural machine intended to be hitched to a tractor and comprising two side units and a frame which extends in a longitudinal direction, each side unit comprising a mounted arm that pivots in relation to the frame around a respective folding axis oriented substantially parallel to the longitudinal direction, each side unit comprising a tool unit connected to the frame by means of the respective arm and being able to occupy a work position in which it rests on the ground, each side unit comprising a connection means which is configured to allow the respective tool unit to move in relation to the respective arm and which comprises at least one lightening actuator enabling an upward force to be exerted on each tool unit in work position.

Discussion of the Background

Such an agricultural machine is known from the document EP 3 086 632 A1. On this machine, a lightening actuator of the spring or hydraulic jack type is articulated between each arm and the combined tool unit. The lightening actuator enables an upward force to be exerted on the respective tool unit. Thus, each tool unit is able to follow the ground contours by moving vertically in relation to the frame.

This machine is designed in such a way that in the tool units work position, each lightening actuator operates independently of the other resilient support element. The result is that the pressure exerted on the ground by one tool unit is independent of the pressure exerted on the ground by the other tool unit. One drawback of this type of operation is that when the ground contours cause a tool unit in work position to move upwards in relation to the frame, the maximum pressure exerted by the tool unit on the ground increases greatly, thus increasing the risk of deterioration of the soil surface. Moreover, the greater the pressure of one or more tool units on the ground, the greater the power required to move the machine during work.

SUMMARY OF THE INVENTION

The purpose of the present invention is to propose an agricultural machine where the maximum pressure exerted by a tool unit on uneven ground is lower, so that plant cover is preserved.

To this end, an important feature of the invention consists in the fact that the machine comprises a tie-rod connected to each of the arms by a respective upper joint allowing at least a pivoting around an upper axis parallel to the respective folding axis.

In the case of uneven ground, the tie-rod then transfers part of the pressure exerted by one tool unit on the ground to the other tool unit, thereby enabling the force of the lightening actuators to be distributed between the two tool units. As a result, a tool unit in work position moving upwards in relation to the frame, following the ground contours, causes a smaller increase in the pressure it exerts on the ground.

Other features and advantages of the invention will become clear through the following description, with references to the attached drawings, which show non-restrictive examples of several embodiments of the agricultural machine according to the invention.

DESCRIPTION OF THE PREFERRED EMBODIMENT

In the following description, the concepts of "forward", "backward", "front" and "rear" are defined looking in a direction of advance A.

Figure 1:
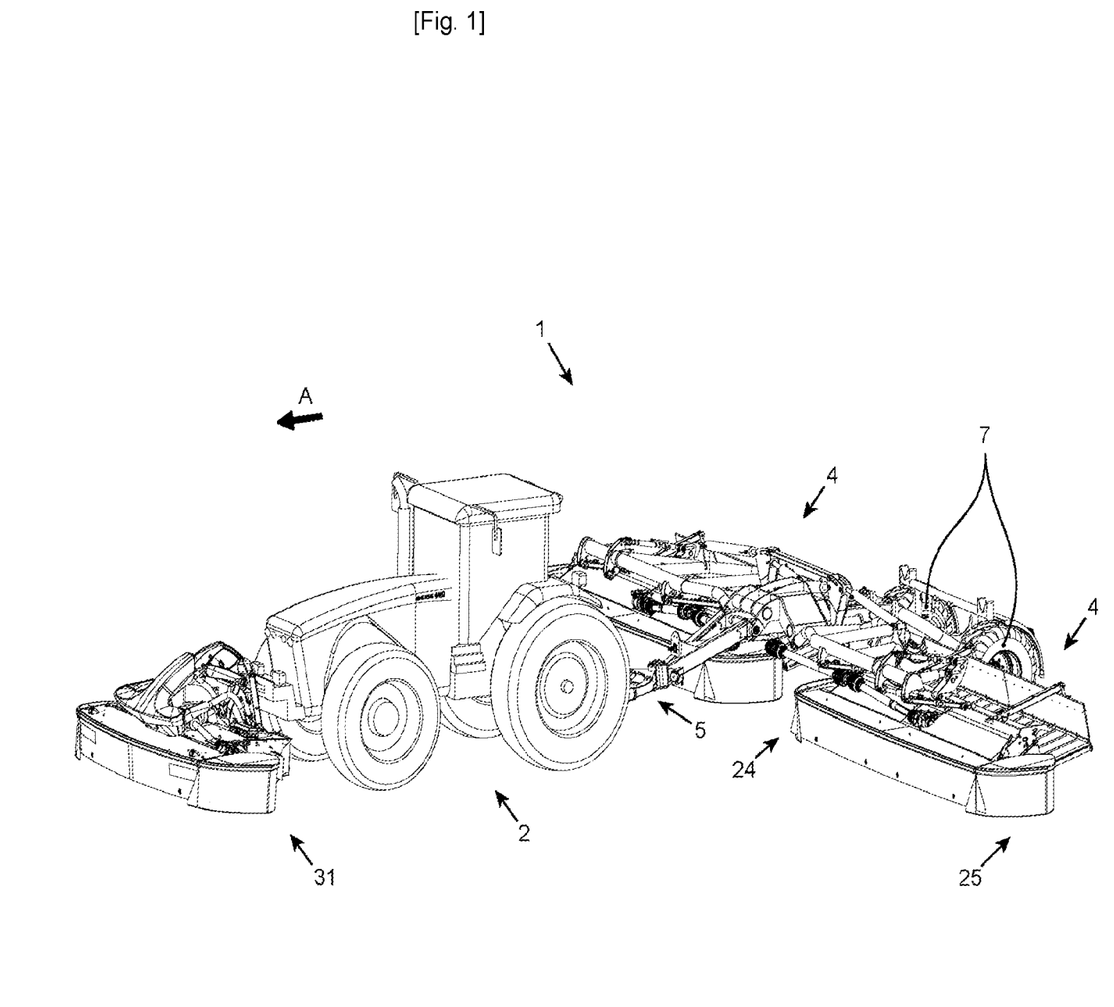
FIG. 1 shows a perspective view of a machine according to the invention in the tool unit work position and hitched to a tractor, with a front equipment also hitched to the front of the tractor.

As can be seen in FIG. 1, the agricultural machine 1 is intended to be hitched to a tractor 2. The tractor 2 is able to move the machine 1 in the direction of advance A and of to drive it. The machine 1 comprises a frame 3, 13 and two side units 4, and preferably only two side units 4. It also comprises a hitching device 5 intended to connect it to the tractor 2. The hitching device 5 is located at the front end of the frame 3, 13. The frame 3, 13 is preferably located behind the tractor 2 when the machine 1 is connected to it, although the machine 1 could also be hitched to a front hitch. The hitching device 5 comprises two lower pins designed to hang on the tractor's lower hitching arms 2. The frame 3, 13 is articulated with, and preferably on, the hitching device 5, around a substantially vertical and preferably forward tilted hitching axis 6.

The frame 3, 13 is provided with at least one wheel 7, and preferably two, in contact with the ground S and mounted to pivot with the frame 3, 13 around a rolling axis 8, in order to transfer part of the weight of the machine 1 to the ground S and to facilitate its movement in the direction of advance A. The rolling axis 8 is located at the rear of the frame 3, 13. Part of the weight of the machine 1 is also transferred to the tractor 2 via the hitching device 5.

Figure 2:
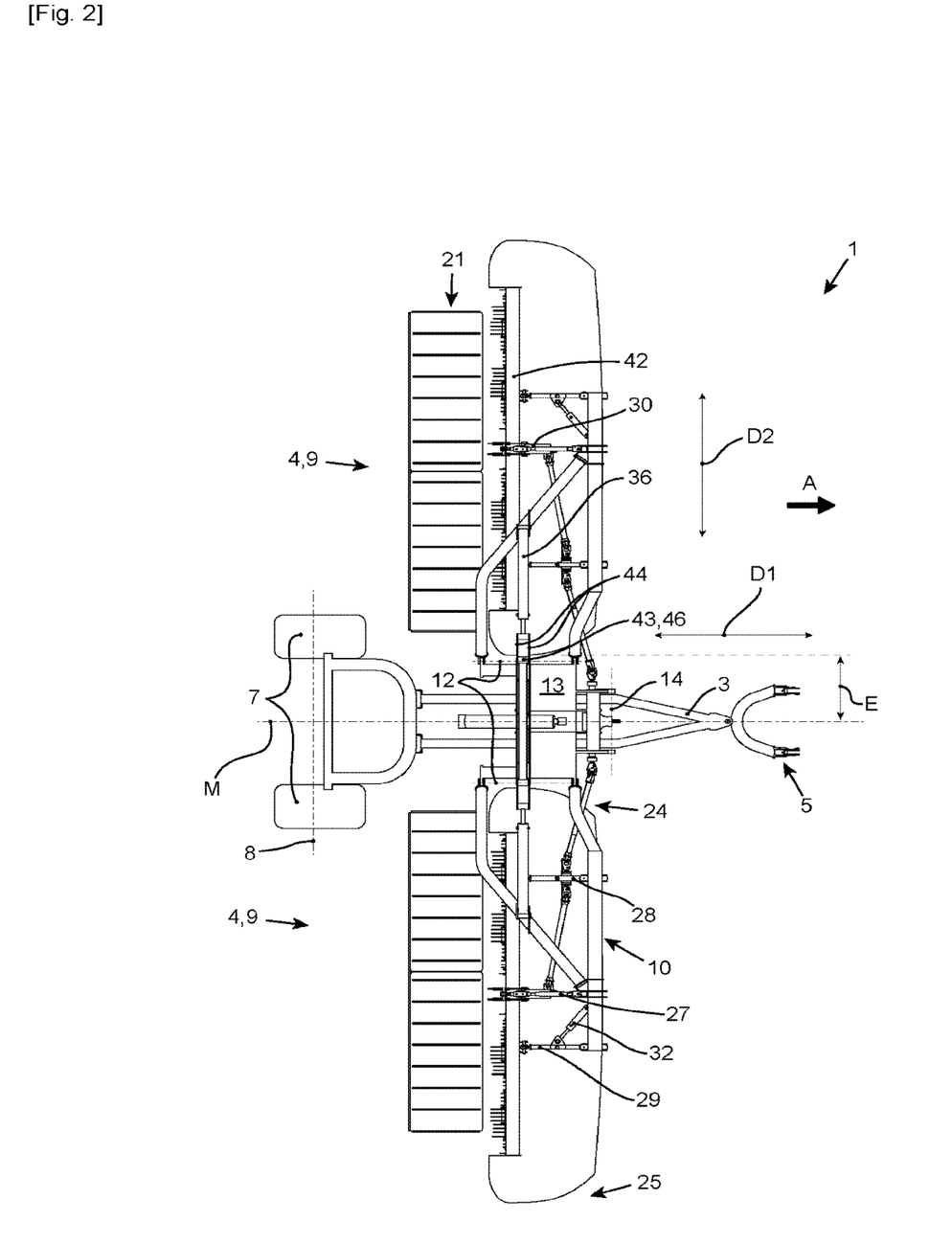
FIG. 2 shows a top view of a machine according to the invention in the tool unit work position.

As shown in FIG. 2, the frame 3, 13 extends in a longitudinal direction D1. The longitudinal direction D1 is parallel to the direction of advance A and is preferably substantially horizontally oriented. A median plane M is oriented parallel to the longitudinal direction D1 and preferably substantially vertically. It is oriented perpendicular to the rolling axis 8. The median plane M furthermore passes through the hitching axis 6.

Each side unit 4 comprises a tool unit 9 and an arm 10. Each arm 10, respectively each side unit 4 is mounted to pivot in relation to the frame 3, 13 around a respective folding axis 12 via a longitudinal joint 11. Each arm 10, respectively each side unit 4, is directly connected to the frame 3, 13 by the respective longitudinal joint 11. Each tool unit 9 is connected to the frame 3, 13, preferably each one on one respective longitudinal side, by means of the respective arm 10.

Figure 3:
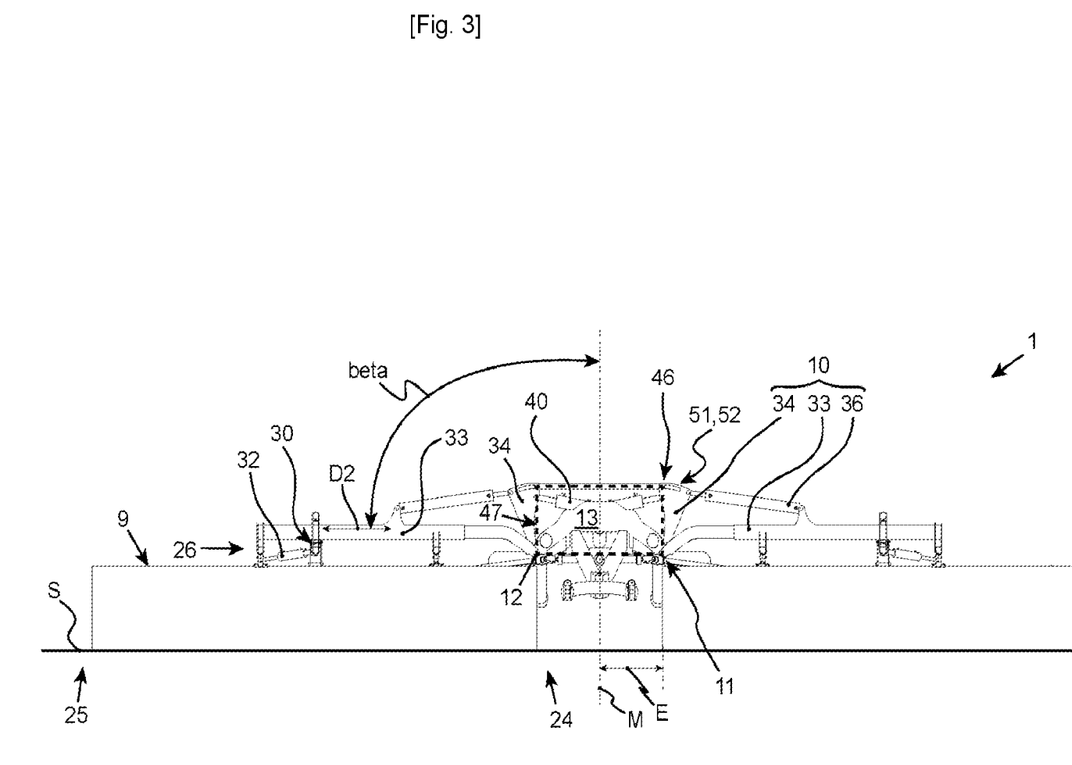
FIG. 3 shows a front view of a machine according to the invention in the nominal tool unit work position.

Each arm 10 has an elongated shape and has a longitudinal dimension D2. The longitudinal dimension D2 is the largest dimension of an arm 10. The longitudinal dimension D2 is substantially orthogonal to the longitudinal direction D1, and preferably substantially orthogonal to the median plane M when the tool units 9 are in nominal work position. As shown in FIG. 3, in the nominal work position of the tool units 9, the machine 1 is on flat and preferably horizontal ground S. In this position, the side units 4, respectively the tool units 9, are symmetrical relative to the median plane M.

Each folding axis 12 is substantially parallel to the median plane M, and preferably parallel to the longitudinal direction D1, at least in the work position of the tool units 9. However, each folding axis 12 could form an angle of between 0° and 45° with the longitudinal direction D1.

Each side unit 4 also comprises a connection means 26. Each tool unit 9 is connected to the respective arm 10 by means of the respective connection means 26. The connection means 26 is preferably a combination of guide rods 27, 28, 29. The connection means 26 comprises at least two rods 27, 28, 29, and preferably three, namely an upper rod 27, an inner rod 28 and an outer rod 29, substantially parallel to one another, at least when projected on the median plane M. It is noted that the upper rod 27, the inner rod 28 and the outer rod 29 are substantially parallel to one another when projected on the plane of the ground S. The connection means 26 is configured to allow the respective tool unit 9 in the work position to move relative to the respective arm 10, at least vertically. Each tool unit 9 can, for example, pivot relative to the respective arm 10 around at least one axis parallel to the longitudinal direction D1 by means of the respective connection means 26. In the preferred example embodiment shown in the figures, the rods 27, 28, 29 of the connection means 26 enable the respective tool unit 9 in work position to move freely relative to the respective arm 10.

Each tool unit 9 can occupy a work position (FIGS. 1 to 3, 5 and 6) in which it rests on the ground S. In work position of a tool unit 9, the weight of the corresponding side unit 4 induces a downward torque around the respective folding axis 12 and a pressure from the tool unit 9 on the ground S. For the sake of simplification, the pressure exerted by this (or these) tool unit(s) 9 on the ground S is referred to in this document as "pressure from one or the tool unit(s) 9".

Each connection means 26 also comprises a lightening actuator 30 articulated on one hand to the respective arm 10 by means of a front joint 37 and on the other hand to the respective tool unit 9. Each lightening actuator 30 exerts an upward force on the respective tool unit 9 in work position. It is preferably designed using a hydraulic jack, one of whose chambers is hydraulically connected to a prestressed accumulator in work position. Thus, the pressure of the tool unit 9 on the ground S can be reduced by means of the lightening actuator 30. In doing this, the lightening actuator 30 transfers part of the weight of the respective side unit 4 to the frame 3, in work position of the corresponding tool unit 9. Alternatively, each lightening actuator 30 can be designed using a spring or similar resilient support.

It is noted that when a tool unit 9 in work position moves downwards relative to the frame 3, 13, the distance between the respective arm 10 and the tool unit 9 increases, as does the force exerted by the respective lightening actuator 30 on this tool unit 9. This results in a reduction of the pressure exerted on the ground S by the tool unit 9 concerned. It is also noted that in this case, the corresponding arm 10 pivots downwards around the respective folding axis 12, increasing the respective orientation angle beta. When the length of a lightening actuator 30 is maximal, the distance between the arm 10 and the respective tool unit 9 is preferably minimal.

Reciprocally, when a tool unit 9 in work position moves upwards relative to the frame 3, 13, the distance between the tool unit 9 and the corresponding arm 10 decreases, reducing the force applied by the respective lightening actuator 30 on the tool unit 9. The pressure exerted on the ground S by the tool unit 9 then increases, and the respective orientation angle beta decreases.

As can be seen in FIG. 3, each arm 10 comprises a support arm 33, a rocker 34 and a transport actuator 36. The support arm 33 is articulated to the frame 3, 13 around the respective folding axis 12. The support arm 33 is connected to the respective tool unit 9 by means of the respective connection means 26.

Each rocker 34 is articulated with the frame 3, 13 around an axis parallel to the folding axis 12, and preferably around the respective folding axis 12. The transport actuator 36 is articulated on one hand with the respective rocker 34 and on the other hand with the respective support arm 33, preferably around joints with axes parallel to the folding axis 12. In work position of a tool unit 9, the length of the respective transport actuator 36 is fixed, and is preferably minimal. Each arm is thus rigid at least in work position of the respective tool unit 9.

An important feature of the invention consists in the fact that the machine 1 comprises a tie-rod 35 connected, preferably directly, to each of the arms 10 by a respective upper joint 46 allowing at least one pivoting around an upper axis 46a parallel to the respective folding axis 12. The tie-rod 35 is thus pivotally mounted with, and preferably on, each arm 10 by the respective upper joint 46 around the folding axis 12.

Due to this feature, when, in work position of the tool units 9, the ground S contours involve that one of the tool units 9 exerts a different pressure on the ground S only when the machine 1 is on flat and horizontal ground S, the total pressure exerted on the ground S by the tool units 9 is distributed between the two tool units 9. The tie-rod 35 allows a distribution of the pressure between the two tool units 9 if and only if the machine 1 comprises only two side units 4.

It is emphasised that the transmission of the pressure exerted by one tool unit 9 on the ground S to the other tool unit 9 is instantaneous. An initial pressure refers to the pressure of a tool unit 9 "before" the pressure transmission (or distribution). The resulting pressure refers to the pressure "after" distribution, in other words, the actual pressure from a tool unit 9. When the word "pressure" is not followed by an attribute, it refers to the resulting pressure. The maximum pressure is the highest of the tool units' 9 pressures. The total pressure of the tool units 9 is the sum of the pressures of the tool units 9. Of course, the initial total pressure is equal to the resulting total pressure.

Thus, part of the initial pressure of a first tool unit 9 whose initial pressure is the highest is transmitted by the tie-rod 35 to the second tool unit 9 (whose initial pressure is the lowest), so that the resulting pressure of the first tool unit 9 is lower than its initial pressure. In other words, the tool unit 9 whose initial pressure is the lowest bears part of the initial pressure of the other tool unit 9 (whose initial pressure is the highest and) whose resulting pressure is then lower than the initial pressure. Through the implementation of the tie-rod 35, the maximum pressure exerted by the tool units 9 on the ground S is lower, which has the advantage of preserving the soil surface S and reducing the power required to move the machine 1 during work.

We refer to position of a tool unit 9 in relation to the frame 3, 13 in comparison of the position of the tool unit 9, more specifically, the position of the respective front joint 37, with its position in the nominal work position of the tool units 9. In a symmetrical configuration, the ground S contours imply that the tool units 9 are in a same position (low, nominal work or high) with respect to the chassis 3, 13. In a symmetrical configuration, the tie-rod 35 does not imply any tool unit 9 pressure distribution, and the initial pressure of a tool unit 9 is equal to its resulting pressure.

In an asymmetrical configuration (example in FIG. 6), a first tool unit 9 (on the right in FIG. 6) is higher relative to the frame 3, 13 than the second tool unit 9, implying that the initial pressure of the first tool unit 9 is higher than that of the second tool unit 9. The second tool unit 9 then bears part of the initial pressure of the first tool unit 9, leading to a resulting pressure of the first tool unit 9 that is lower than its initial pressure.

Furthermore, in the above example, the resulting pressure of the second tool unit 9 is higher than its initial pressure. Thanks to the implementation of the tie-rod 35, the minimum pressure of the tool units 9 is thus increased, which is advantageous due to the fact that when the pressure of a tool unit 9 is too low, this tool unit 9 adapts less quickly to the ground S contours, so that its work is less regular and of lower quality.

According to an interesting feature, the tie-rod 35, the frame 3, 13 and the arms 10 each form one side of a distribution four bar linkage 47 projected on a transverse and preferably orthogonal plane to the longitudinal direction D1. The distribution four bar linkage 47 could also be designated by the term "four bar mechanism". Each side of the distribution four bar linkage 47 has a fixed length. The side of the distribution four bar linkage 47 formed by an arm 10, and preferably by the rocker 34, is oriented substantially parallel to the median plane M in a symmetrical configuration. Each rocker 34, respectively arm 10, is thus articulated with the tie-rod 35 at the level of an upper joint 46 with a respective upper axis 46a parallel to the folding axis 12. The sides of the distribution four bar linkage 47 are thus articulated around the two longitudinal joints 11 and the two upper joints 46. The joints 11, 46 of the distribution four bar linkage 47 can be ball joints, but are preferably produced through pivot joints around the folding axes 12 and the upper axes 46a. As can be seen in FIG. 3, in work position, the upper joints 46 are located above the folding axes 12. Each side of the distribution four bar linkage 47 is rigid, and preferably produced by a single rigid body, namely the tie-rod 35, an arm 10, the frame 3, 13 and the other arm 10.

As shown in FIG. 3, the distance separating a folding axis 12 and the respective upper axis 46a is equal to the distance between the other folding axis 12 and the other upper axis 46a, at least in work position of the tool units 9. Furthermore, the distance between the folding axes 12 is substantially equal to the distance between the upper axes 46a. Thus, at least in work position of the tool units 9, the distribution four bar linkage 47 is a parallelogram, viewed in the longitudinal direction D1. The pivoting of one arm 10 around the respective folding axis 12 then implies a pivoting of the other arm 10 at the same angle and in the opposite rotation direction.

In nominal work position of the tool units 9, the lightening actuators 30 are arranged in such a way as to exert substantially the same force on their respective tool unit 9, so that the pressure exerted by one tool unit 9 on the ground S is equal to the pressure exerted by the other tool unit 9 on the ground S. In this way, the maximum pressure exerted by the tool units 9 on the ground S is also reduced in symmetrical configuration.

Figure 4:
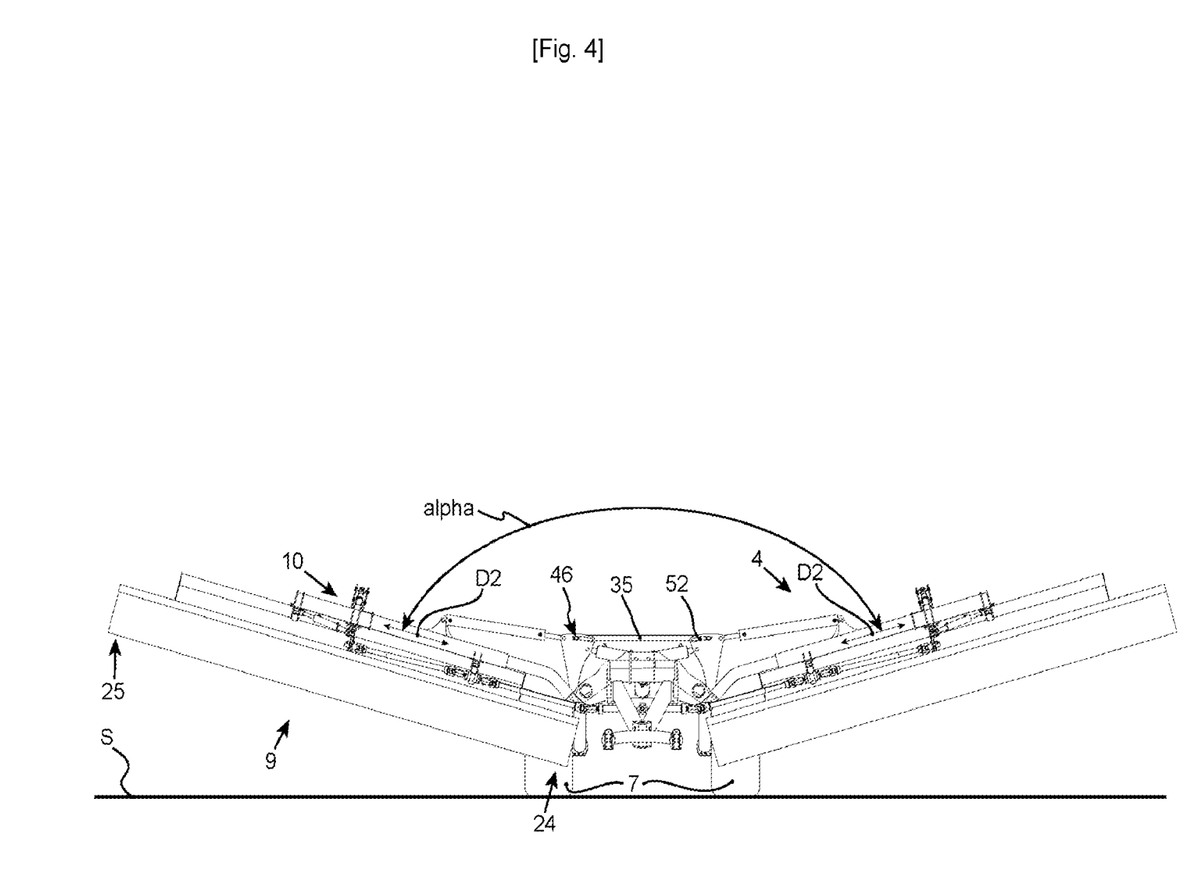
FIG. 4 shows a front view of a machine according to the invention in the tool unit headland position.

As shown in FIG. 4, it is provided that each tool unit 9 be able to occupy a headland position in which the tool unit 9 is remote from the ground S. In the headland position of a tool unit 9, the outer end 25 of a tool unit 9 is more remote from the ground S than the inner end 24 of the tool unit 9. In addition, in the headland position, as in work position, the longitudinal dimension D2 of a tool unit 9 is substantially perpendicular to the median plane M when viewed from above.

It can be seen in FIG. 3 that each arm 10 is remote from the ground S. Each arm 10 is located at least partially above the respective tool unit 9 in work position, and preferably also in headland position.

In order to reach the headland position of a tool unit 9, the tool unit 9 is pivoted from its work position around the respective folding axis 12 at a predetermined headland angle. To this end, a headland actuator 40 is associated with each arm 10. Each headland actuator 40 is articulated on one hand with the frame 3, 13 and on the other hand with the respective arm 10, respectively with the respective rocker 34, preferably around axes parallel to the respective folding axis 12.

The pivoting range of an arm 10, respectively of a side unit 4, around the folding axis 12 is limited in amplitude. In work position of a tool unit 9, the respective orientation angle beta can thus vary between a minimum and a maximum work value. When the headland actuator 40 has its maximum length (on the left in FIG. 6), the orientation angle beta has its maximum work value. In a preferred embodiment, the maximum work value of the orientation angle beta is between 70° and 120°, preferably between 80° and 110°, and even more preferably between 90° and 100°.

An opening angle alpha is formed by the longitudinal dimensions D2 seen along the longitudinal direction D1. It is equal to the sum of the orientation angles beta. In nominal work position of the tool units 9, the opening angle alpha has a nominal value. In work position of the tool units 9, the weight of each side unit 4 exerts a force on the tie-rod 35 such that as long as the opening angle alpha has the nominal value, the arms 10 exert a force on the tie-rod 35.

In an example embodiment not shown, in work position of the tool units 9, the opening angle alpha is constant, irrespective of the ground S contours. In the preferred embodiment, in order to increase the pivoting range of the arms 10, an arrangement 51 of the arm(s) 10 and/or of the tie-rod 35 is provided, enabling the opening angle alpha to have a value lower than the nominal value.

The arrangement 51 enables the arms 10 to pivot upwards, even if the orientation angle beta of an arm 10 has its maximum work value. The arrangement 51 thus enables the machine 1 to be better adapted to uneven ground S. "Uneven ground S" means ground S that is not perfectly flat. The surface of uneven ground S therefore has contours and/or is uneven. The nominal value of the opening angle alpha is greater than 140°, more preferably 160°, and even more preferably 175°.

Figure 6:
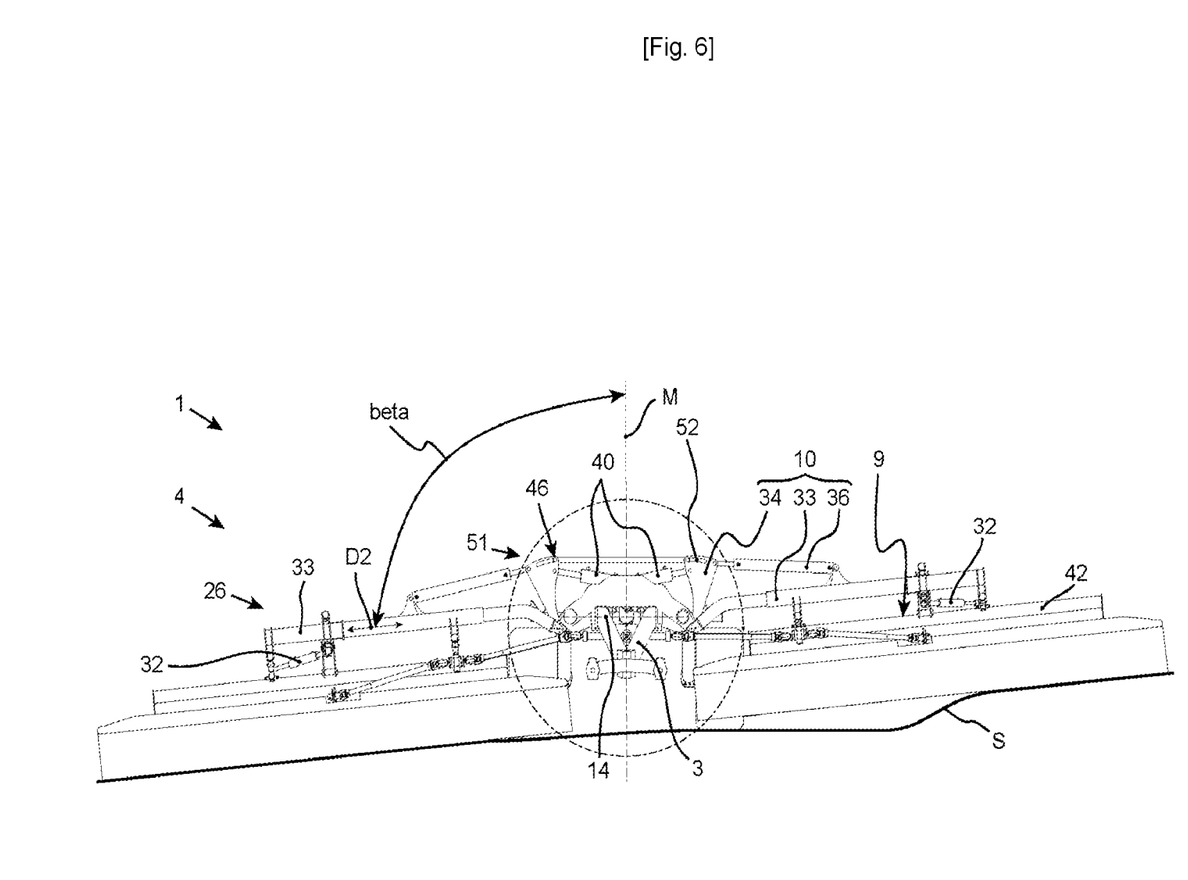
FIG. 6 shows a front view of a machine according to the invention in the work position on uneven ground.
Figure 7:
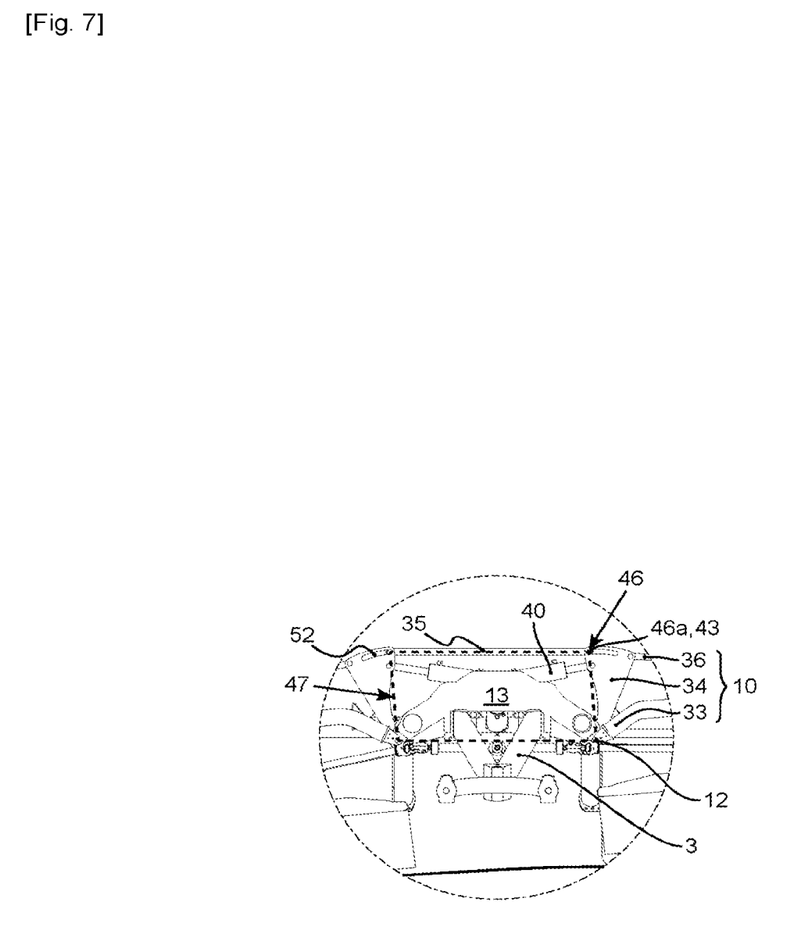
FIG. 7 is a detailed view of FIG. 6.

According to a preferred example embodiment shown in FIG. 6, the arrangement 51 consists in oblong holes 52 made in each of the arms 10 in which the respective upper joint 46 can slide. The tie-rod 35 is made of a rigid rod and the upper joint 46 of a pivot pin 43 with a respective upper axis 46*a*. The tie-rod 35 is such that it is able to transmit a traction force between the arms 10. The rocker 34 preferably comprises two parallel plates 44, in each of which an oblong hole 52 is made. The pivot pin 43 can slide in the or each oblong hole 52.

When the opening angle alpha has the nominal value, the upper joints 46 are located at the inner ends of the oblong hole 52. When the value of the opening angle alpha is lower than the nominal value, the arms 10 do not exert any force on the tie-rod 35, so that at least one of the upper joints 46 is not located at the inner end of the respective oblong hole 52.

In an alternative example embodiment not shown, the arrangement 51 is produced by the tie-rod 35 comprising or consisting of an actuator, a chain, a cable or similar.

As can be seen in FIG. 4, in the headland position of the tool units 9, each orientation angle beta is at its minimum value. In a preferred example embodiment, when an orientation angle beta has its minimum value, the respective upper joint 46 is located at the outer end of the oblong hole 52. The arrangement 51 thus enables a better clearance of the tool units 9 from the ground S in the headland position. The minimum value of the orientation angle beta is between 50° and 110°, preferably between 70° and 90°, and even more preferably between 70° and 80°.

The headland actuators 40 are simply realised by jacks, preferably double-acting hydraulic jacks. In work position of a tool unit 9, in order to allow the respective side unit 4, respectively its arm 10, to pivot, the respective headland actuator 40 is mounted in a floating manner. The length of the floating mounted actuator adapts depending on the forces to which it is subjected.

In work position of the tool units 9, the headland actuators 40 are connected to one another by a hydraulic circuit, preferably enabling the free flow of oil between them. Thus, the floating position of the headland actuators 40 is carried out in a simple manner, without requiring several of the tractor's hydraulic valves 2. The length of the headland actuators 40 can then be simultaneously adjusted via a control device, for example, to reach the headland position of the tool units 9.

Alternatively, in work position of the tool units each headland actuator 40 is connected to a specific hydraulic valve 2 of the tractor, preferably in the floating position. According to another embodiment variant, in work position of the respective tool unit 9, each headland actuator 40 is connected to a pressure accumulator so as to exert an upward force on the respective arm 10, respectively on the tool unit 9, enabling the pressure of the tool unit 9 to be further reduced in addition to the force exerted by the respective lightening actuator 30.

One or the control device can also be adjusted so as to be able to actuate each of the headland actuators 40 separately, so that the machine 1 may occupy a so-called partial work position, in which one tool unit 9 is in the headland position while the other tool unit 9 is in work position. In the partial work position, the headland actuator 40 corresponding to the tool unit 9 in work position is adjusted to a predetermined fixed length, preferably a median length between its minimum and maximum lengths, so as to transfer part of the weight of the corresponding side unit 4 to the frame 3, 13 and to reduce the pressure exerted on the ground S by this tool unit 9.

Figure 8:
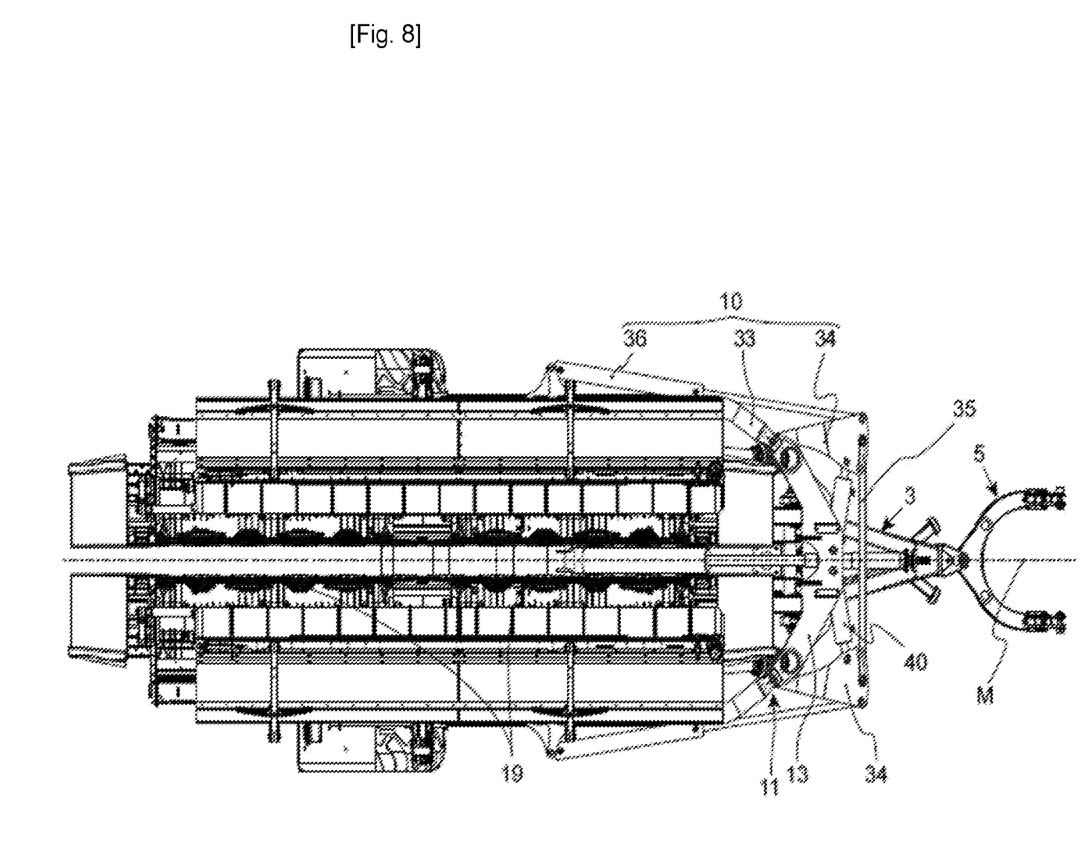
FIG. 8 is a top view of a machine according to the invention in transport position.

In order to transpose the machine 1 between the work position and a tool unit 9 transport position, the frame 3, 13 comprises a tilter 13 and a chassis 3 articulated to one another around a tilting axis 14 transverse to the longitudinal direction D1, and preferably orthogonal to the median plane M. In the headland and work positions of the tool units 9, the frame 3, 13 is rigid. To switch from the work position to the transport position, the rear of the tilter 13 is tilted around 90° upwards, and preferably forwards, around the tilting axis 14. The transport actuator 36 then advantageously enables the tool units 9 to be moved into a transport position. As shown in FIG. 8, in the transport position, the length of the tool units 9 is substantially parallel to the median plane M. It is noted that the orientation angle beta is greater than its maximum work value in the transport position. In the transport position, the side units 4 are remote from the ground S.

Each rod 27, 28, 29 is articulated, preferably directly, on one hand to the respective arm 10 and on the other hand to the respective tool unit 9. The joints of the rods 27, 28, 29 with the respective arm 10, as well as the joints of the rods 27, 28, 29 with the respective tool unit 9, can be of the cardan joint type and are preferably ball joints.

When projected on the median plane M, the inner 28 and outer 29 rods each form a four bar linkage referred to as a lightening four bar linkage, with the respective upper rod 27, arm 10 and tool unit 9. Each lightening actuator 30 is mounted in floating configuration in work position of the respective tool unit 9. In addition, in work position of the respective tool unit 9, the lightening actuator 30 is connected to an accumulator. Thanks to the lightening four bar linkage(s), the connection means 26 is thus configured to allow the tool unit 9 in work position to move substantially vertically relative to the respective arm 10, so as to be able to follow the ground S contours. Furthermore, the headland actuator 30 can be connected to the tractor 2 so as to adjust the pressure in the accumulator, thereby enabling the pressure exerted by the respective tool unit 9 on the ground S to be adjusted. When the tool unit 9 is not in work position (for example, in a tool unit's headland position 9), the length of the lightening actuator 30 is fixed, and preferably has its maximum length, so as to prevent any displacement of the tool unit 9 relative to the respective arm 10.

When projected on a plane perpendicular to the median plane M and parallel to the longitudinal direction D1, the inner 28 and outer 29 rods each form a four bar linkage referred to as an overlap four bar linkage with the respective upper rod 27, arm 10 and tool unit 9. The overlap four bar linkage(s) is (are) preferably deformable thanks to an overlap actuator 32. The connection means 26 is thus configured to allow each tool unit 9 in work position to move substantially horizontally relative to the respective arm 10. The spacing E is the distance between each tool unit 9 and the median plane M. The spacing E is adjustable thanks to the overlap actuator 32. Since the part between the tool units 9 is not worked by the machine 1, the adjustment of the spacing(s) E makes it possible to adapt to the width of a front equipment 31 and/or to adjust the overlap between the side unit(s) 4 and the front equipment 31. It is conceivable that one or more spacings E may be adjusted to be equal to zero.

The overlap actuators 32 can be connected to one another so that in work position of the tool units 9, irrespective of the value of a spacing E, the two spacings E are constantly equal. In this way, the maximum pressure exerted by the tool units 9 on the ground S is also reduced in a symmetrical configuration.

In one example embodiment variant, it is conceivable that the weights of the side units 4 and/or the spacings E are not equal, and/or that the distribution four bar linkage 47 is not a parallelogram. A compensation system that is electronically adjustable and/or includes sensors then makes it possible to dynamically adjust the force of each lightening actuator 30 individually, preferably in such a way that the pressures of the tool units 9 are constantly equal. For example, to distribute the pressures of the tool units 9, it is possible to evaluate each spacing or the spacings E by means of at least one sensor and to transmit this measurement to one of the machine's 1 drive units, which then automatically adapts the pressure exerted on the ground by at least one of the tool units 9, preferably by driving at least one of the lightening actuators 30.

Figure 5:
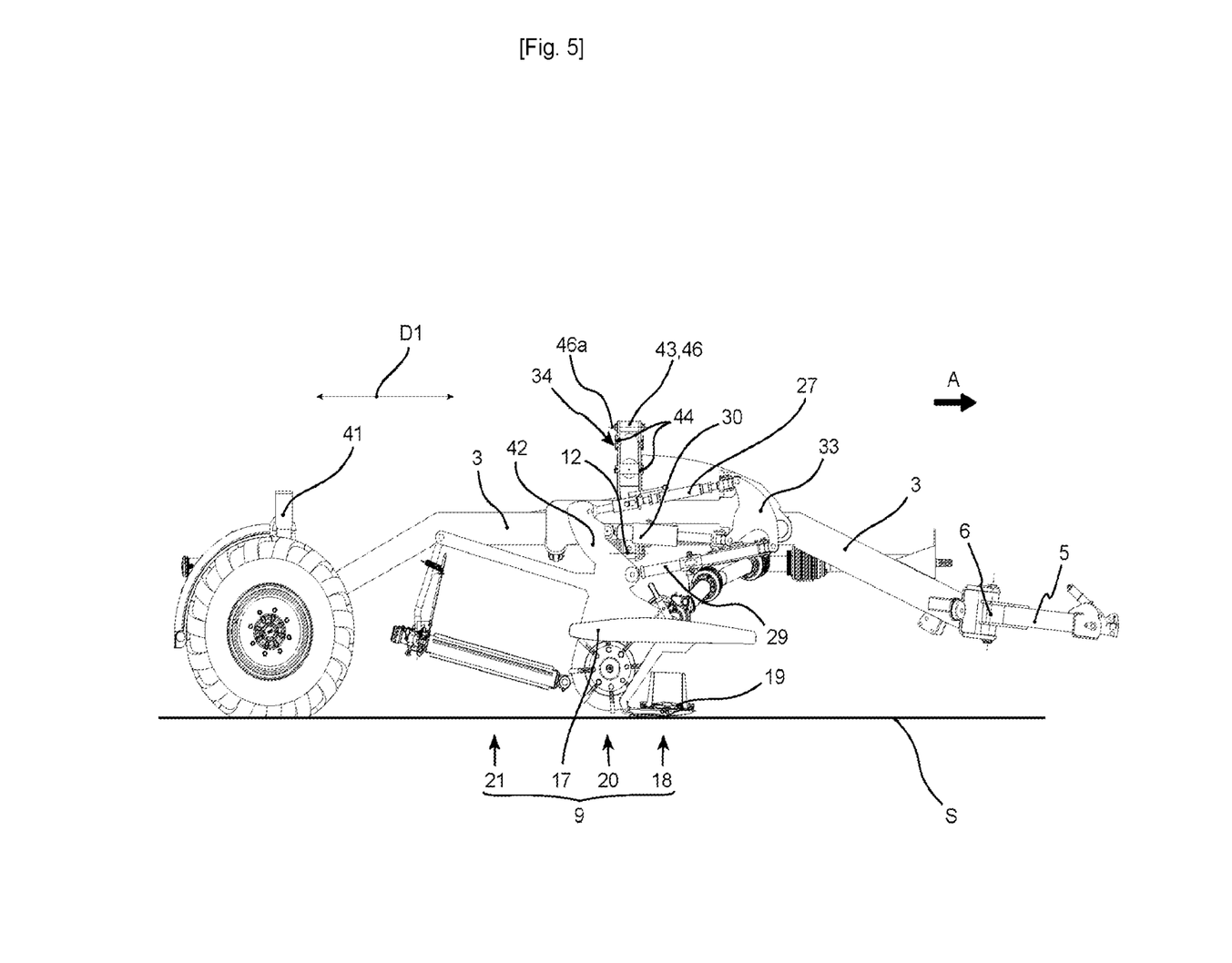
FIG. 5 shows a side view of a machine according to the invention in the tool unit work position.

As shown in FIG. 5, in the preferred example embodiment, each tool unit 9 comprises at least one mowing device 18. Each mowing device 18 is equipped with several rotors 19, such as discs or drums. When the machine 1 is driven by the tractor 2, the rotors 19 are driven in rotation around substantially vertical axes. The rotors 19 are fitted with blades, which extend beyond the periphery of the rotors 19. The rotors 19 are arranged at more or less regular intervals on the mowing device 18. They are driven in rotation from below, preferably by means of a set of gears incorporated into a sealed casing containing a lubricant. Thanks to the advance of the machine 1 and the rotation of the blades, the latter cut the product, such as standing plants. The set of gears is actuated by transmission means that are capable of transmitting the required power from the tractor 2.

Each tool unit 9 can also comprise at least one conditioner 20 and/or one grouping equipment 21 located, in work position of the tool unit 9, behind the respective mowing device 18. Each side unit 4 additionally comprises a framework 42, which connects the tool unit 9 to the respective connection device 26. The rods 27, 28, 29 are directly articulated to the framework 42. The framework 42 is rigidly fastened to the respective tool unit 9. The framework 42 makes it possible to support the respective tool unit 9 and, if necessary, the grouping equipment 21.

Each tool unit 9 can also or alternatively comprise at least one windrowing or tedding rotor comprising a hub to which several arms carrying flexible forks or tines at their free ends are fastened, which at least one rotor is driven in rotation around a substantially vertical drive axis and equipped with at least one ground support wheel. Each tool unit 9 could also comprise at least one rotor driven around a horizontal axis and equipped with cutting hammers or flails.

The actuators 30, 32, 36, 40 can, for example, be carried out in the form of hydraulic jacks, pneumatic jacks and/or hydraulic or electric motors, or even in the form of springs.

The machine that has just been described is only one example embodiment, which does not restrict the field of protection defined by the following claims.

What is claimed as new and desired to be secured by Letters Patent of the United States is:

1. An agricultural machine intended to be hitched to a tractor, the agricultural machine comprising:
two side units; and
a frame, which extends in a longitudinal direction,
wherein each side unit comprises
an arm mounted such that the arm pivots in relation to the frame around a respective folding axis oriented substantially parallel to the longitudinal direction,
a tool unit connected to the frame through the respective arm and able to occupy a work position in which the tool unit rests on the ground, and a connection means, which is configured to allow the respective tool unit to move in relation to the respective arm and which comprises a lightening actuator that exerts an upward force on each tool unit in the work position and that transfers part of a weight of the respective side unit to the frame in the work position of the corresponding tool unit,
wherein the machine further comprises a tie-rod connected to each of the arms by a respective upper joint allowing at least one pivoting around an upper axis parallel to the respective folding axis,
wherein a dimension of the frame extends in the longitudinal direction in the work position, and
wherein the tie-rod, the frame, and the arms each form one side of a distribution four bar linkage projected on a plane transverse to the longitudinal direction.

2. The agricultural machine according to claim 1, wherein when the tool units are in the work position and the machine is on flat ground, the lightening actuators are arranged in such a way as to exert the same force on the respective tool unit.

3. The agricultural machine a according to claim 1, wherein each arm is mounted to pivot in relation to the frame around a respective folding axis and in relation to the tie-rod around an upper axis, wherein a distance between a folding axis and the respective upper axis is substantially equal to a distance between the other folding axis and the upper axis, and wherein a distance between the folding axes is substantially equal to a distance between the upper axes.

4. The agricultural machine according to claim 1, wherein an arrangement of one or more arms or of the tie-rod is provided for, allowing an opening angle formed by longitudinal dimensions of the arms to have a value lower than a value the opening angle has in nominal work position of the tool units.

5. The agricultural machine according to claim 1, wherein an arrangement of one or more arms and of the tie-rod is provided for, allowing an opening angle formed by longitudinal dimensions of the arms to have a value lower than a value the opening angle has in nominal work position of the tool units.

6. The agricultural machine according to claim 1, wherein the tie-rod is carried out by a rigid rod.

7. The agricultural machine according to claim 1, wherein each arm is combined with a headland actuator articulated to the frame and to the arm, and in the work position of the tool units, the headland actuators are connected to one another.

8. The agricultural machine according to claim 7, wherein the headland actuators can be actuated separately so that one tool unit is in a headland position while the other tool unit is in the work position.

9. The agricultural machine according to claim 1, wherein in the work position of the tool units, the connection means is configured to allow the tool units to move substantially horizontally relative to the respective arm, and so that regardless of the value of a spacing between each tool unit and the median plane, the two spacings between each tool unit and the median plane are equal.

10. The agricultural machine according to claim 1, further comprising a tilter common to the two side units.

11. The agricultural machine according to claim 1, wherein the arm includes a support arm articulated to the frame around the respective folding axis, and a rocker articulated to the frame around an axis parallel to the respective folding axis, the rocker including two parallel plates each including an oblong hole in which the respective upper joint can slide.

* * * * *